(12) United States Patent
Venkataramana et al.

(10) Patent No.: US 10,212,240 B2
(45) Date of Patent: Feb. 19, 2019

(54) METHOD FOR TRACKING CONTENT AND ELECTRONIC DEVICE USING THE SAME

(71) Applicant: Samsung Electronics Co., Ltd., Suwon-si, Gyeonggi-do (KR)

(72) Inventors: Balaji Nerella Venkataramana, Bangalore (IN); Chandan Pramanik, Bangalore (IN); Sandeep Kumar Soni, Hsr Layout (IN); Sailesh Kumar Sathish, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 15/183,225

(22) Filed: Jun. 15, 2016

(65) Prior Publication Data
US 2017/0195437 A1     Jul. 6, 2017

(30) Foreign Application Priority Data

Apr. 22, 2015 (IN) .............. 2076/CHE/2015
Jan. 18, 2016 (IN) .............. 2076/CHE2015
May 26, 2016 (KR) .......... 10-2016-0064827

(51) Int. Cl.
*G06F 15/16* (2006.01)
*H04L 29/08* (2006.01)
*G06F 17/30* (2006.01)

(52) U.S. Cl.
CPC .............. *H04L 67/22* (2013.01); *G06F 17/30* (2013.01); *G06F 17/30864* (2013.01); *G06F 17/30867* (2013.01); *H04L 67/02* (2013.01)

(58) Field of Classification Search
CPC ................................................ G06F 17/30867
See application file for complete search history.

(56) References Cited

U.S. PATENT DOCUMENTS

| | | | |
|---|---|---|---|
| 5,898,836 A | 4/1999 | Freivald et al. | |
| 6,445,834 B1* | 9/2002 | Rising, III | ........ G06F 17/30256 382/190 |
| 2003/0039376 A1* | 2/2003 | Stach | .................... G06T 1/0028 382/100 |
| 2008/0147851 A1 | 6/2008 | Le et al. | |
| 2009/0171968 A1* | 7/2009 | Kane | ................. G06F 17/30867 |
| 2011/0029443 A1* | 2/2011 | King | ..................... G06K 9/228 705/310 |
| 2011/0197133 A1 | 8/2011 | Tarjan et al. | |
| 2011/0246446 A1 | 10/2011 | Jarboe et al. | |

(Continued)

FOREIGN PATENT DOCUMENTS

KR   10-2009-0000284 A    1/2009

*Primary Examiner* — Hieu T Hoang
(74) *Attorney, Agent, or Firm* — Jefferson IP Law, LLP

(57) ABSTRACT

An apparatus and method for tracking content are provided. The apparatus is an electronic device that includes a communication circuit and a processor electrically connected to the communication circuit. The processor may be configured to receive information about a tracking target item from an external electronic device, to receive content from a content provider, determine a degree of semantic similarity between the tracking target item and the content, generate at least one update related to the tracking target item, based on the degree of semantic similarity, and send the at least one update to the external electronic device.

17 Claims, 15 Drawing Sheets

(56) References Cited

U.S. PATENT DOCUMENTS

| | | | |
|---|---|---|---|
| 2011/0257960 A1* | 10/2011 | Sathish | G06Q 10/06 704/9 |
| 2011/0258229 A1* | 10/2011 | Ni | G06F 17/277 707/776 |
| 2013/0226896 A1 | 8/2013 | Chin et al. | |
| 2014/0244631 A1 | 8/2014 | Arthur et al. | |

* cited by examiner

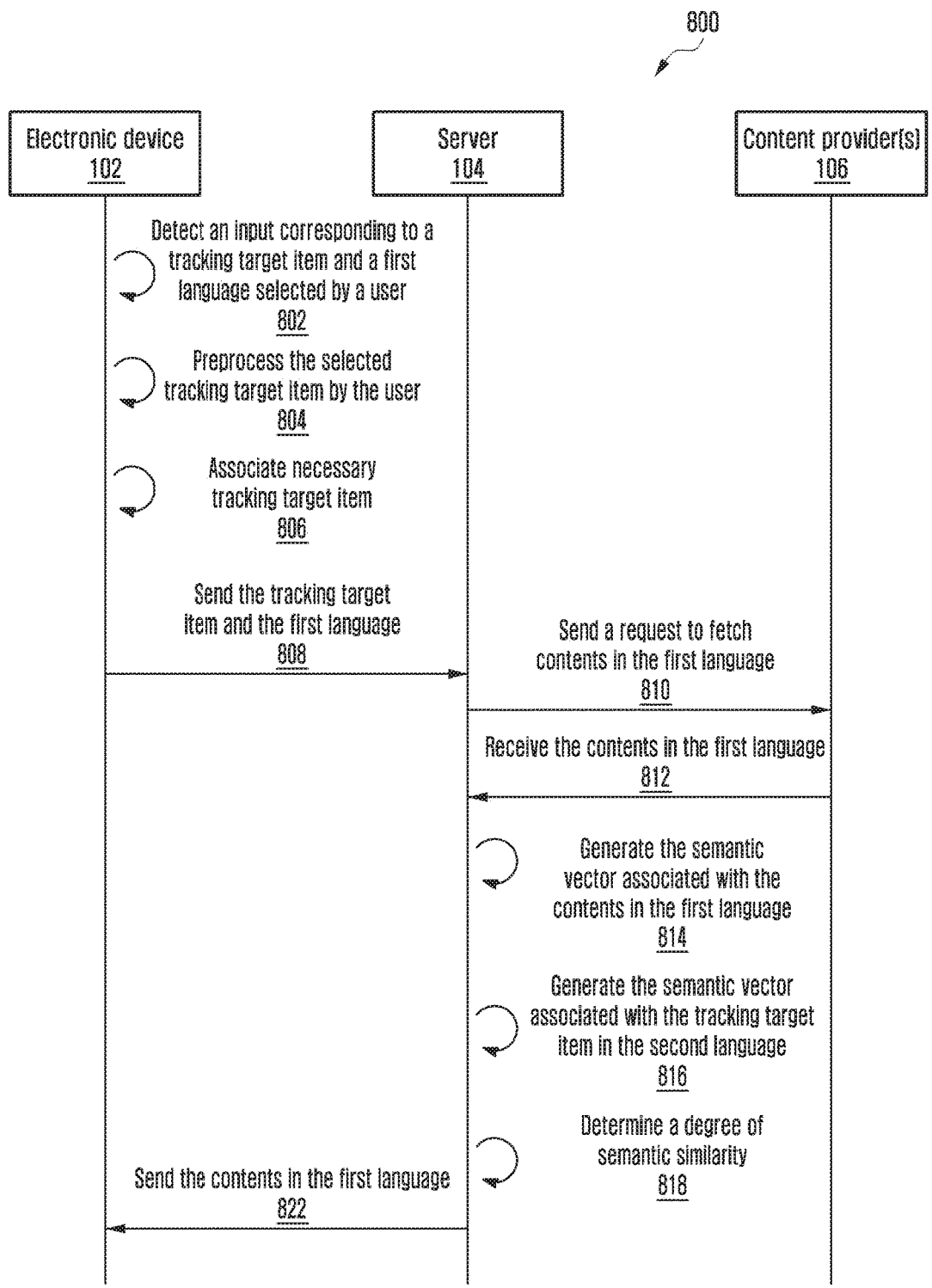

FIG. 9A
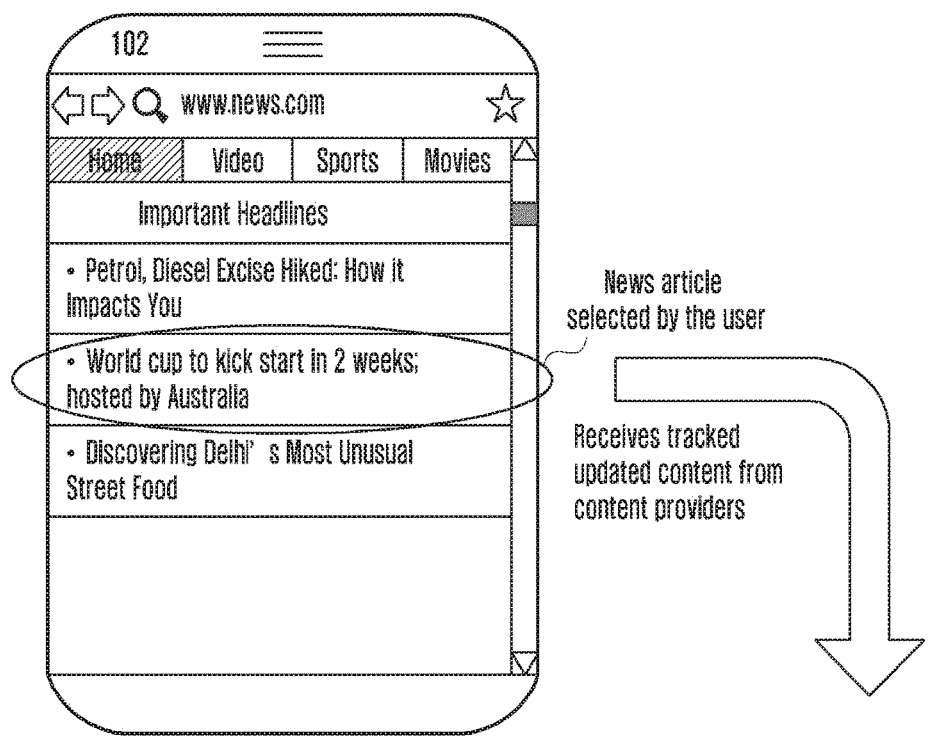

METHOD FOR TRACKING CONTENT AND ELECTRONIC DEVICE USING THE SAME

CROSS-REFERENCE TO RELATED APPLICATION(S)

This application claims the benefit under 35 U.S.C. § 119(e) of an Indian Provisional application filed on Apr. 22, 2015 in the Indian Patent Office and assigned Serial number 2076/CHE/2015, and under 35 U.S.C. § 119(a) of an Indian patent application filed on Jan. 18, 2016 in the Indian Patent Office and assigned Serial number 2076/CHE/2015, and of a Korean patent application filed on May 26, 2016 in the Korean Intellectual Property Office and assigned Serial number 10-2016-0064827, the entire disclosure of each of which is hereby incorporated by reference.

TECHNICAL FIELD

The present disclosure relates to a method for tracking content and an electronic device using the method.

BACKGROUND

With a great variety of electronic devices such as mobile devices becoming popularized dramatically, the use of the Internet, through the web browsers of the electronic devices, is increasing. Namely, more and more information may be collected, stored, and transferred over the Internet. Therefore, users of the electronic devices are required to actively access the Internet so as to obtain desired information and may search for updated information at any time.

Typically, in order to check new information (e.g., update information) related to contents (e.g., news, images, music, etc.) available on the web browser, users may have to frequently visit a website on which the contents are posted. For example, even if there is no new information related to such contents, users may have to often visit that website.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for tracking content and an electronic device using the method.

According to various embodiments of the present disclosure, an electronic device (e.g., a mobile device, a server, etc.) may identify an item desired to track by a user (i.e., a tracking target item) and also search for contents related to the tracking target item. If any content related to the tracking target item is found, the electronic device may notify the user that there is new content. Through this, the electronic device may notify the existence of new content related to the tracking target item even though the user does not individually visit a website.

In accordance with an aspect of the present disclosure, an electronic device is provided. The electronic device includes a communication circuit and a processor electrically connected to the communication circuit. The processor may be configured to receive information about a tracking target item from an external electronic device, to receive content from a content provider, to determine a degree of semantic similarity between the tracking target item and the content, to generate at least one update related to the tracking target item, based on the degree of semantic similarity, and to send the at least one update to the external electronic device.

In accordance with another aspect of the present disclosure, a method for tracking content in an electronic device is provided. The method includes operations of receiving information about a tracking target item from an external electronic device, receiving content from a content provider, determining a degree of semantic similarity between the tracking target item and the content, generating at least one update related to the tracking target item based on the degree of semantic similarity, and sending the at least one update to the external electronic device.

In accordance with another aspect of the present disclosure, an electronic device is provided. The electronic device includes a display, a communication circuit, and a processor electrically connected to the display and the communication circuit. The processor may be configured to receive an input of selecting a tracking target item from a user, to send information about the tracking target item to an external electronic device, and to receive at least one update related to the tracking target item and based on a degree of semantic similarity from the external electronic device.

In accordance with another aspect of the present disclosure, a method for receiving tracked content in an electronic device is provided. The method includes operations of receiving an input of selecting a tracking target item from a user, sending information about the tracking target item to an external electronic device, and receiving at least one update related to the tracking target item and based on a degree of semantic similarity from the external electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a flow diagram illustrating a method for tracking content configured in a language being different from that of a tracking target item according to various embodiments of the present disclosure;

FIGS. 9A and 9B are drawings illustrating a user interface for selecting a tracking target item and displaying content tracked on the basis of the tracking target item according to various embodiments of the present disclosure;

Throughout the drawings, like reference numerals will be understood to refer to like parts, components, and structures.

DETAILED DESCRIPTION

Figure 1:
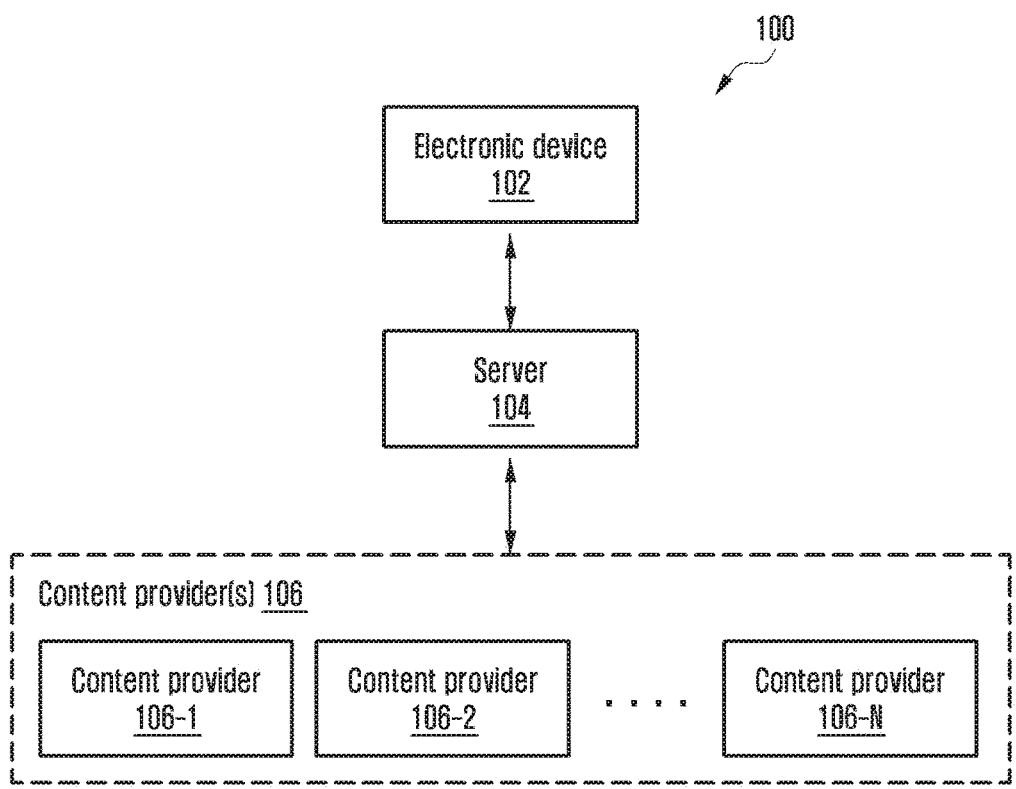
FIG. 1 is a diagram illustrating a content tracking system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as being merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventors to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "A or B" or "at least one of A and/or B" may include A, may include B, or may include both A and B. Expressions including ordinal numbers, such as "first" and "second," etc., may modify various elements. However, the above expressions do not limit the sequence and/or importance of the elements and are used merely for the purpose to distinguish an element from the other elements. In case where a certain (e.g., the first) element is referred to as being "connected" or "accessed" (functionally or communicatively) to other (e.g., the second) element, it should be understood that the element is connected or accessed directly to the other element or through another (e.g., the third) element.

In the present disclosure, the expression "configured to" may be used, depending on situations, interchangeably with "adapted to", "having the ability to", "modified to", "made to", "capable of", or "designed to". In some situations, the expression "device configured to" may mean that the device may operate with other device(s) or other component(s). For example, the expression "processor configured to perform A, B and C" may mean a dedicated processor (e.g., an embedded processor) for performing the above operations, or a general-purpose processor (e.g., central processing unit (CPU) or an application processor) capable of performing the above operations by executing one or more software programs stored in a memory device.

An electronic device according to various embodiments of the present disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, and a wearable device. For example, a wearable device may include at least one of an accessory type (e.g., a watch, a ring, a bracelet, an anklet, a necklace, an electronic accessory, eyeglasses, contact lenses, or a head-mounted device (HMD)), a textile or cloth assembled type (e.g., electronic clothing), a body attached type (e.g., a skin pad or tattoo), and a body transplant circuit. In some embodiments, an electronic device may include at least one of a television (TV), a digital versatile disc (DVD) player, an audio device, a refrigerator, an air-conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In an embodiment, an electronic device may include at least one of various medical devices (e.g., magnetic resonance angiography (MRA), magnetic resonance imaging (MRI), computed tomography (CT), a scanning machine, an ultrasonic wave device, etc.)), a navigation device, a global navigation satellite system (GNSS), an event data recorder (EDR), a flight data recorder (FDR), a vehicle infotainment device, an electronic equipment for a ship (e.g., navigation equipment for a ship, gyrocompass, etc.), avionics, a security device, a head unit for a vehicle, an industrial or home robot, a drone, an automated teller machine (ATM), a point of sales (POS), and various Internet of things (IoT) devices (e.g., a lamp, various sensors, a sprinkler, a fire alarm, a thermostat, a street light, a toaster, athletic equipment, a hot water tank, a heater, a boiler, etc.). According to an embodiment, an electronic device may include at least one of furniture, a portion of a building/structure or car, an electronic board, an electronic signature receiving device, a projector, and various measuring meters (e.g., a water meter, an electric meter, a gas meter, a wave meter, etc.). In various embodiments, an electronic device may be flexible or a combination of two or more of the aforementioned devices. An electronic device according to various embodiments of the present disclosure is not limited to the aforementioned devices. In the present disclosure, the term a user may refer to a person who uses an electronic device, or a machine (e.g., an artificial intelligence device) which uses an electronic device.

According to various embodiments, an electronic device (e.g., a server, a mobile device, etc.) may track content related to a tracking target item. The electronic device may receive, from a user, an input for selecting the tracking target item or information about the tracking target item. The electronic device may determine a degree of semantic similarity between the tracking target item and contents fetched from at least one content provider. The electronic device may identify one or more contents related to the tracking target item from the contents, based on the semantic similarity, and then notify a user that there is the identified content (e.g., new information update).

According to various embodiments, the electronic device may receive contents from at least one content provider. Specifically, the electronic device may perform semantic indexing for the received contents. Additionally, based on a semantic relationship between the contents and the tracking target item, the electronic device may generate a semantic vector. Further, based on the semantic vector, the electronic device may determine the degree of semantic similarity between the tracking target item and the contents.

According to various embodiments, the electronic device may provide at least one update related to the tracking target item by filtering the contents based on the degree of semantic similarity.

According to various embodiments, the electronic device may set, as the tracking target item, a data cluster, a story, a webpage document object model (DOM) tree, a uniform resource identifier (URI), data (e.g., image, text, web link, etc.) contained in an area selected in a webpage by a user, or combination thereof.

According to various embodiments, the electronic device may filter contents, based on a data cluster selected by a user. A data cluster may include and represent user intention information. For example, user intention information may include user's interested information, favorite information, and the like which the electronic device obtains by analyzing a usage history of applications or contents. For example, such user intention information, interested information or favorite information may have at least one vector value having weight or probability which is set for at least one topic.

According to various embodiments, the electronic device may update contents, based on a current state of the tracking target item, an update to the tracking target item, or a combination thereof.

Various embodiments of the present disclosure disclose a method for tracking the content by the server. The method may include receiving the tracking target item and a first language selected by the user, wherein the tracking target item may be configured in a second language which is different from the first language selected by the user. The method may include determining the degree of semantic similarity between the tracking target item in the second language and contents in the first language fetched from the plurality of content providers. The method may include sending the contents in the first language to the electronic device of the user based on the degree of semantic similarity.

According to various embodiments, the method may include fetching the contents in the first language from the plurality of content providers. The method may include generating a semantic vector associated with the contents in the first language. Further, the method may include generating a semantic vector associated with the tracking target item in the second language. Further, the method may include determining the degree of semantic similarity based on a semantic relationship between the semantic vector associated with contents in the first language and the semantic vector associated with the tracking target item in the second language.

Unlike the systems and methods of the related art, the proposed mechanism may be used to track and notify the updated content to the user. The user may select the tracking target item (e.g., a web page, an image, a music, a multimedia file, a news, or any area including the same) and may send a request including the selected tracking target item to the server for tracking the content (i.e., to track updates related to the selected tracking target item). In the proposed method, the server may use a proprietary indexing mechanism that is capable of figuring out the progression of the selected tracking target item (i.e., updates of the selected tracking target item). For example, the server may use a model that is language agnostic so that the user may switch languages dynamically. The server may automatically stop to track the content related to the selected tracking target item if the content regresses beyond a threshold from each preceding track.

FIG. 1 is a diagram illustrating a content tracking system according to various embodiments of the present disclosure.

Referring to FIG. 1, according to various embodiments, the system 100 may include an electronic device 102, a server 104, and a plurality of content providers 106. The content providers 106 may comprise one or more content providers (e.g., content provider 106-1, content provider 106-2 . . . content provider 106-N). The electronic device 102 may be, for example (without being limited thereto), a laptop, a desktop computer, a mobile phone, a smart phone, personal digital assistants (PDAs), a tablet, a phablet, a consumer electronic device, or any other electronic device.

According to various embodiments, the electronic device 102 may receive an input of selecting the tracking target item from the user. For example, the user may select a certain area on the screen of the electronic device 102 and then select, as the tracking target item, at least one object contained in the selected area.

According to various embodiments, the tracking target item may be selected to track the content (namely, so as to track the update related to the selected tracking target item). For example, the tracking target item may include a data cluster, a story, a webpage document object model (DOM) tree, a uniform resource identifier (URI), data (e.g., image, text, web link, etc.) contained in an area selected in a webpage by a user, or combination thereof.

According to various embodiments, the electronic device 102 may receive, from the user, an input of selecting a content region on the web page displayed on the display. For example, the electronic device 102 may receive a long press gesture on the content region from the user.

According to various embodiments, the electronic device 102 may receive a user's input of selecting the data cluster generated from the user's browsing history. The electronic device 102 may receive a long press gesture on the data cluster from the user.

According to various embodiments, the electronic device 102 may receive a user's input of dragging and dropping the data cluster onto a "Tracker Canvas".

According to various embodiments, the electronic device 102 may send information about the selected tracking target item to the server 104. After receiving the tracking target item, the server 104 may be configured to fetch the contents from the content providers 106 as illustrated in FIG. 1. The fetched contents from the content providers 106 may be semantically indexed. The server 104 may be configured to generate a semantic vector based on a semantic relationship between the contents and the tracking target item. Based on the semantic vector, the server 104 may be configured to determine a degree of semantic similarity between the tracking target item and the contents.

According to various embodiments, the server 104 may be configured to select an update(s) related to the tracking target item from the contents based on the degree of semantic similarity. The selected update may be sent to the electronic device 102 of the user. In an embodiment, the update related to the tracking target item may be selected by filtering the contents based on the degree of semantic similarity. The update may correspond to an update to the tracking target item, current state of the tracking target item, or combination of same.

According to various embodiments, the user may select the tracking target item and a first language for tracking the content, where the tracking target item may be configured in a second language. For example, the user may select the area on the web page (i.e., tracking target item) and the first language where the selected area may be configured in the second language. In another example, the user may drag and drop an object, representing the first language on the screen of the electronic device 102, onto the area on the web page in the second language.

According to various embodiments, after receiving the tracking target item and the first language selected by the user, the server 104 may be configured to fetch the contents in the first language from the content providers 106. Further, the server 104 may be configured to generate the semantic vector associated with the contents in the first language and the semantic vector associated with the tracking target item in the second language. Based on the semantic relationship between the semantic vector associated with the contents in the first language and the semantic vector associated with the tracking target item in the second language, the server 104 may be configured to determine the degree of semantic similarity. Further, the server 104 may be configured to send the contents in the first language to the electronic device 102 of the user based on the degree of semantic similarity. The electronic device 102 may display the tracked content (i.e., updates related to the selected tracking target item) in the first language. Unlike the systems and methods of the related art, the proposed method may maintain same semantics of the content in the second language while switching the content to the first language.

According to various embodiments, the server 104 may automatically stop tracking the content. In an embodiment, the user may manually stop tracking the content. The server 104 may indicate the same to the user through a user interface (UI). The server 104 may stop tracking the content if the semantic distance exceeds above the threshold. The user may also directly stop tracking the content through the UI.

According to various embodiments, a scenario where the user selects a news item from the web page displayed on the mobile phone (i.e., electronic device 102) may be considered. The news item may be selected for continuous tracking whether any updates are available from the same or different sources (i.e., content providers 106). The server 104 may receive the selected news item from the mobile phone and process the request. After receiving the request, the server 104 may track the content related to the same or similar news item selected by the user on the same or different sources. Further, the server 104 may keep track of the news item to determine whether any update is available. The server 104 may track the selected news item based on a semantic distance calculated between the selected news item and the content fetched from the content providers 106. If the update related to the selected news item is available then, the update may be sent to the mobile phone of the user. The user may access the updated (or tracked) content related to the selected news item.

According to various embodiments, a scenario where the user selects the data cluster for tracking the content from the same or different sources may be considered. The electronic device 102 may send the selected data cluster to the server 104. After receiving the selected data cluster, the server 104 may extract the browsed items such as stories, uniform resource locators (URLs), news items, or the like in the data cluster. Further, the server 104 may determine the current state (i.e., updates) of the browsed items from the same or different sources. The server 104 may send the determined updates related to the browsed items to the electronic device 102 of the user.

According to various embodiments, a scenario where the user selects the first language may be considered. The user may drag and drop the first language on a particular news item in the second language displayed on the screen of the electronic device 102. The server 104 may receive the first language and the news item in the second language. Further, the server 104 fetches the content in the first language from the same or different sources. The server 104 may detect the same news item in the first language and send it to the electronic device 102 of the user.

According to various embodiments, the electronic device 102 may maintain the cluster vector indicating the user preference. In an embodiment, the server 104 may maintain the cluster vector indicating the user preference. Further, the server 104 may maintain the content vector, and the content vector may be extracted from general content such as the web pages. The content vector may be extracted by using a proprietary vector extraction process (i.e., modified semantics mechanism) that provides a distribution of word probabilities including their normalized weight contribution to a topic.

According to various embodiments, the content vector denotes dominant and sub-dominant topics within the web page and also how dominant and sub-dominant topics are distributed. The content vector may be matched against the content vector from another page and their distance based on cosine distance measurement thus, indicating how close the content is together which is used in semantic indexing and tracking. By maintaining similar vector representation, cluster vector may be matched with the content vector for tracking and filtering. For multi-language, each language has fixed model categories, and extracted vector may be mapped to one or more categories. Further, the metadata matching plus category vector mapping may index content cross-language.

According to various embodiments, a scenario where in-device (i.e., in the electronic device 102) tracking only is enabled and there is no need of server 104 may be considered. The content vector may be extracted only for the content indicated by the user to track. Both the content vector and the cluster vector may be extracted using same extraction process. The content vector may be stored internally within a separate table within the database, and the content vector extracted may be also mapped to the data cluster (i.e., topic category) within the electronic device 102. Whenever the web page is mapped to the data cluster, then it may be determined whether there is any track initiated by the user for the data cluster (i.e., from the category that was mapped to the content vector). If available, then matching may be performed to check if the new content may be deemed to be the tracked content of the previously stored content vector. If the match is determined, a new vector may be extracted from latest content and this may replace the old vector for further tracking. The tracked and discovered content may be maintained inside the electronic device 102 with a separate index table.

According to various embodiments, the functionalities performed by the electronic device 102 and the server 104 may be performed by the electronic device 102 alone.

Though FIG. 1 shows a limited overview of the system 100, it is to be understood that other embodiments are not limited thereto. Further, the system 100 may include any number of units communicating among each other.

Figure 2:
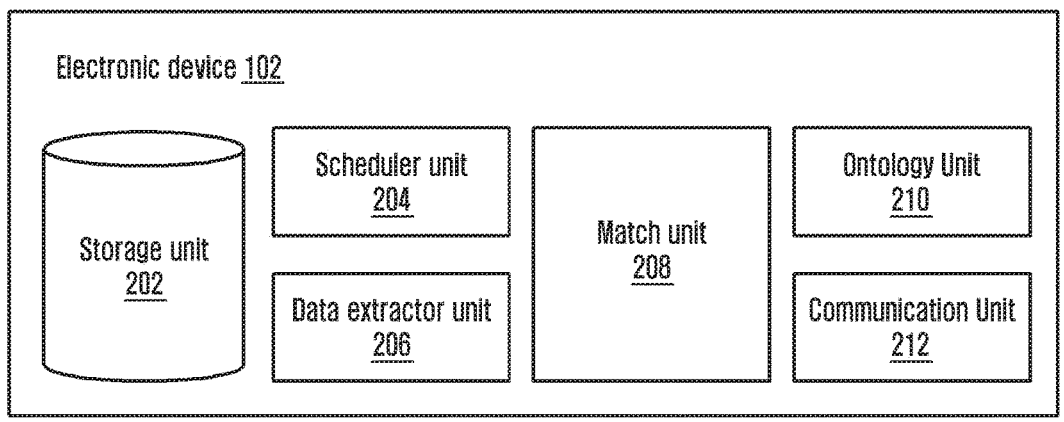
FIG. 2 is a block diagram illustrating the electronic device of the content tracking system of FIG. 1, according to various embodiments of the present disclosure.

FIG. 2 is a block diagram illustrating an electronic device contained in the content tracking system according to various embodiments of the present disclosure.

Referring to FIG. 2, according to various embodiments, the electronic device 102 may include a storage unit (or memory) 202, a scheduler unit 204, a data extractor unit 206, a match unit 208, an ontology unit 210, and a communication unit 212.

According to various embodiments, the storage unit 202 may be configured to store both content vectors as well as clusters of the content. Further, the storage unit 202 may include one or more computer-readable storage media. The storage unit 202 may include non-volatile storage elements. Examples of such non-volatile storage elements may include magnetic hard disk, optical discs, floppy disks, flash memories, or forms of electrically programmable read only memories (EPROMs) or electrically erasable and programmable ROMs (EEPROMs). In addition, the storage unit 202 may, in some examples, be considered a non-transitory storage medium. The term "non-transitory" may indicate that the storage medium is not embodied in a carrier wave or a propagated signal. However, the term "non-transitory" should not be interpreted that the storage unit 202 is non-movable. In some examples, the storage unit 202 may be configured to store larger amounts of information than a memory. In certain examples, a non-transitory storage medium may store data that may, over time, change (e.g., in random access memory (RAM) or cache).

According to various embodiments, the scheduler unit 204 may provide initiation signals for the extraction to happen from the content. Further, the scheduler unit 204 may be scheduled to initiate processing based on pre-set criterion such as when the device is plugged for on-charge, connected to Wi-Fi network, or the like.

According to various embodiments, the data extractor unit 206 may be configured to extract the content semantics from the content. The ontology unit 210 may be configured to manage the clusters including the cluster hierarchy and relations between the clusters. The match unit 208 may be configured to perform distance calculation between the extracted content vector and present cluster. The output of match unit 208 may provide information on which cluster, the extracted content is related to. The communication unit 212 may be configured for communicating internally between internal units and with external devices via one or more networks.

FIG. 2 shows a limited overview of the electronic device 102 but, it is to be understood that other embodiments are not limited thereto. Further, the electronic device 102 may include any number of units communicating among each other.

Figure 3:
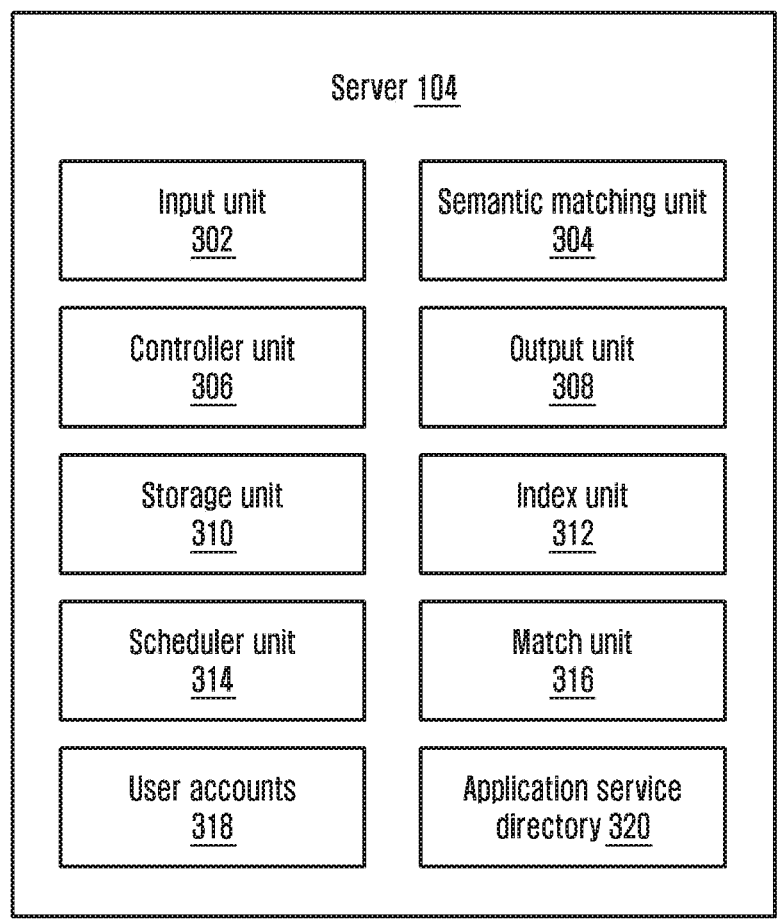
FIG. 3 is a block diagram illustrating a server of the content tracking system of FIG. 1, according to various embodiments of the present disclosure.

FIG. 3 is a block diagram illustrating a server contained in the content tracking system according to various embodiments of the present disclosure.

Referring to FIG. 3, according to various embodiments, the server 104 may include an input unit 302, a semantic matching unit 304, a controller unit (processor) 306, an output unit 308, a storage unit 310, an index unit 312, a scheduler unit 314, a match unit 316, user accounts 318, and an application service directory 320.

According to various embodiments, the input unit 302 may be configured to receive the tracking target item selected by the user. Further, the input unit 302 configured to send the received tracking target item to the semantic matching unit 304. After receiving the tracking target item, the semantic matching unit 304 may be configured to fetch the contents from the content providers 106. The semantic matching unit 304 may be configured to semantically index the contents fetched from the content providers 106. Further, the semantic matching unit 304 may be configured to generate the semantic vector based on the semantic relationship between the contents and the tracking target item.

According to various embodiments, the semantic matching unit 304 may be configured to determine the degree of semantic similarity between the tracking target item and the contents, based on the semantic vector. The controller unit 306 may be configured to select the update related to the tracking target item from the contents based on the degree of semantic similarity. The output unit 308 may be configured to send the update to the electronic device 102 of the user.

According to various embodiments, the input unit 302 may be configured to receive the tracking target item and the first language selected by the user, where the tracking target item is in the second language. Further, the input unit 302 may be configured to send the tracking target item and the first language selected by the user to the semantic matching unit 304. After receiving the tracking target item and the first language, the semantic matching unit 304 may be configured to fetch the contents in the first language from the content providers 106.

According to various embodiments, the semantic matching unit 304 may be configured to generate the semantic vector associated with the contents in the first language. The semantic vector associated with the tracking target item in the second language may be generated by the semantic matching unit 304. Further, the semantic matching unit 304 may be configured to determine the degree of semantic similarity based on the semantic relationship between the semantic vector associated with contents in the first language and the semantic vector associated with the tracking target item in the second language. Further, the output unit 308 may be configured to send the contents in the first language to the electronic device 102 of the user based on the degree of semantic similarity.

According to various embodiments, the storage unit 310 may include one or more computer-readable storage media. Further, the storage unit 310 may include non-volatile storage elements. Examples of such non-volatile storage elements may include magnetic hard disks, optical discs, floppy disks, flash memories, or forms of electrically programmable memories (EPROM) or electrically erasable and programmable (EEPROM) memories. In addition, the storage unit 310 may, in some examples, be considered a non-transitory storage medium. The term "non-transitory" may indicate that the storage medium is not embodied in a carrier wave or a propagated signal. However, the term "non-transitory" should not be interpreted that the storage unit 310 is non-movable. In some examples, the storage unit 310 may be configured to store larger amounts of information than the memory. In certain examples, a non-transitory storage medium may store data that may, over time, change (e.g., in random access memory (RAM) or cache).

According to various embodiments, the index unit 312 may use keywords (sets of keywords) present within each word vector are used to identify occurrence of each topic in the web page. This may form an index denoting a set of word vectors with corresponding location identifiers within the web page. The index may give information about the specific topic that the user browses at a particular location of the web page.

According to various embodiments, the scheduler unit 314 may schedule the cluster and topic extraction process according to some pre-set criterion such as cluster when charging is ON, cluster after receiving N number of documents, or the like.

According to various embodiments, the match unit 316 may perform matching between extracted topic vectors from content against supervised topic vectors for cluster purpose. The user accounts 318 may maintain user specific accounts, including possible user profiles and interest vectors. The application service directory 320 may list the applications, their backend application data address (for sending filter queries), and the type of queries accepted along with associated parameters and accepted data types.

According to various embodiments, the various units of the server 104 as described above may be part of the electronic device 102 for tracking the content related to the tracking target item selected by the user without departing from the scope of the present disclosure.

FIG. 3 shows a limited overview of the server 104 but, it is to be understood that other embodiments are not limited thereto. Further, the server 104 may include any number of units communicating among each other for tracking the content.

Figure 4:
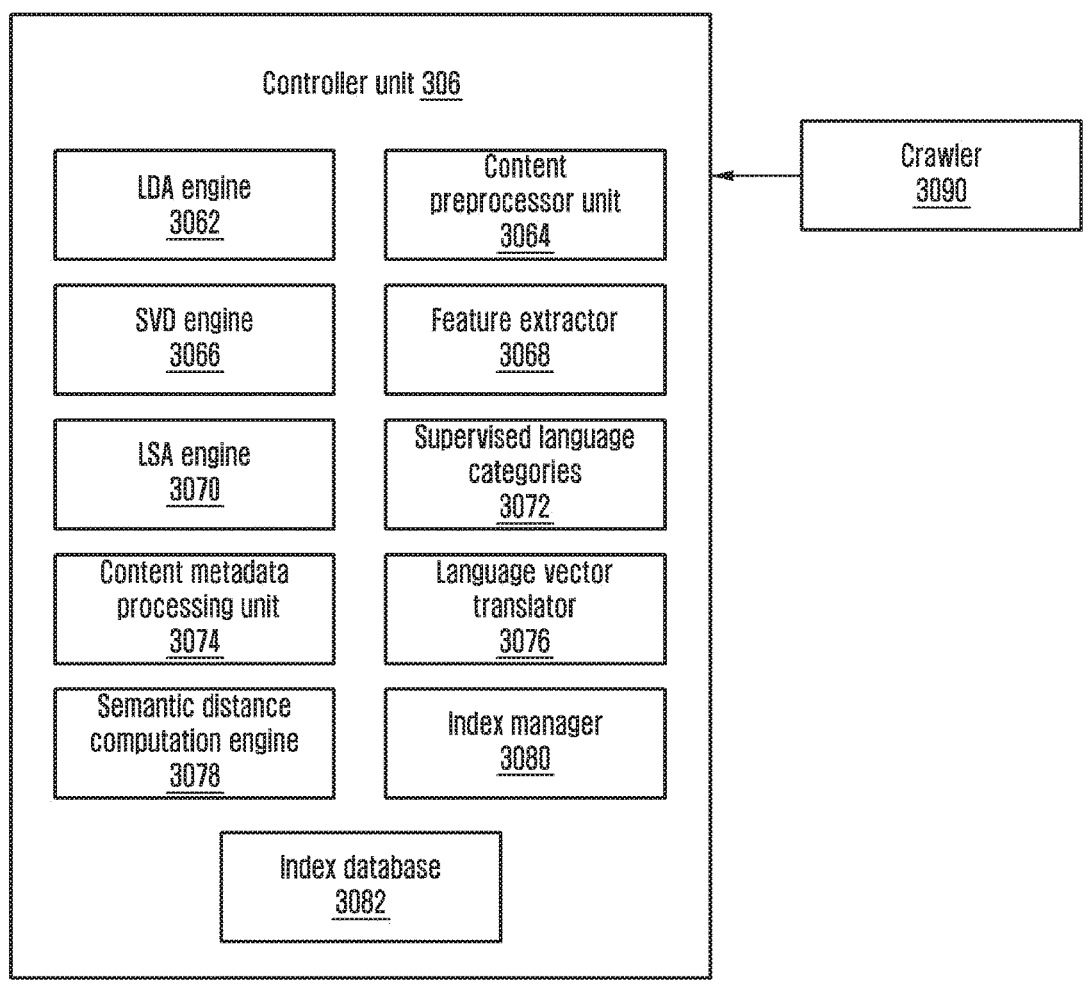
FIG. 4 is a block diagram illustrating the controller unit of the server of FIG. 3, according to various embodiments of the present disclosure.

FIG. 4 is a block diagram illustrating a controller unit of the server of the content tracking system according to various embodiments of the present disclosure.

Referring to FIG. 4, according to various embodiments, the controller unit 306 may include a latent Dirichlet allocation (LDA) engine 3062, a content preprocessor unit 3064, a singular value decomposition (SVD) engine 3066, a feature extractor 3068, a latent semantic analysis (LSA) engine (or alternatively latent semantic indexing (LSI)) 3070, supervised language categories 3072, a content metadata processing unit 3074, a language vector translator 3076, a semantic distance computation engine 3078, an index manager 3080, and an index database 3082.

According to various embodiments, the LDA engine 3062 utilizes a statistical model, specifically a topic model originally used in the area of natural language processing for extracting key topics out of a large number of text documents. The basic idea of LDA is that the document may be considered as a mixture of a limited number of topics and each meaningful word in the document may be associated with one of the topics. In the LDA engine 3062, the topic proportion of every document is a K-dimensional hidden variable randomly drawn from the same Dirichlet distribution, where K is the number of topics. For topic inference (i.e., non-generative model), the LDA may take a collection of documents and K as input and infer a set of K topics mentioned in the collection. A topic is intuitively a cluster of tokens that tend to co-occur in the same subset of documents. Thus, generative semantics of LDA are complete, and LDA may be acknowledged as the most popular approach for building topic models.

According to various embodiments, the controller unit 306 may include various units as illustrated in FIG. 4 that aid in creating semantic index, match and cross language maps.

According to various embodiments, the cross language mapping may retrieve a page encoded in another language based on the semantics of a current anchor page. Typically, cross-language systems may be employed in information retrieval and search systems. Such systems may use language translation techniques and fall under the general umbrella of cross language information retrieval (CRIL) processes that decomposes the multi-language semantics into a monolingual information retrieval space.

According to various embodiments, page-page mapping is performed rather than on search-based information retrieval. For this reason, token-based translation system will not work as the full page-page translation is both erroneous and resource consuming. During page translations, the semantics and language structures do not map and the process itself is highly language dependent. Unlike the systems and methods of the related art, a language-independent system where page-page cross-language mapping is determined based on topic distributions may be proposed.

According to various embodiments, for cross-language index, a multi-layer filter may be used for semantic association. The restriction is that a fixed set of languages initially are supported. However, the system may be designed in such a way that more languages may be added and cross-language content associations may be done incrementally with existing index. Thus, ensuring that existing index need not be re-computed in the event of a new language may be added. For example, the current supported languages are English, Korean, and Spanish. The web page crawler 3090 may retrieve documents (web pages) from a fixed set of domains within each language.

According to various embodiments, the following stage may use a hybrid topic distribution mapping process. The topic distribution models may be used in generating a co-occurrence model wherein the probability of two similar topics cross-occurring in a multilingual corpus may be calculated. Based on a Dirichlet distribution, the supervised topic models for each language sets may be generated. After generating the supervised topic models for each language sets, topic inference within the documents may be performed based on the language specific topic models. Further, co-occurrence probability for Latent Semantic Indexing (LSI) may be calculated. In this model, the latent topic distribution (latent factors) may be taken care by interdependent LDA (iLDA) inference while clustering aspect may be handled by LSI. The LSI based clusters may provide more accurate clusters as it takes variance into account as compared to taking direct cosine distances between the topic distributions within documents.

According to various embodiments, initially, supervised model may set "N" number of topics each for English ("X" topics modeled but "Y" selected for cross-language indexing), Korean and Spanish based on supervised LDA models. Thus, the topic resolution used for cross-language indexing stands currently at "Y" topics. This may be increased to improve both granularity and accuracy for other topics. A "Science" model using web pages crawled within science topics for English, Korean and Spanish may be trained. Then, using LDA process, convergent model for "Science" in its respective language resulting in three science models: one for English, Korean and Spanish may be created. Thus, a total of "Z" models may be created for the cross-language experiment with "Y" models in each language.

According to various embodiments, Table 1 may describe document-topic spread matrix, where "D" represents documents while "T" represents topics distributed within "D".

TABLE 1

|    | D1    | D2    | D3    | D4    | D5    | D6    |
|----|-------|-------|-------|-------|-------|-------|
| T1 | 0.22  | 0.02  | 0.015 | 0.542 | 0.015 | 0.218 |
| T2 | 0.136 | 0.14  | 0.232 | 0.231 | 0.448 | 0.107 |
| T3 | 0.26  | 0.02  | 0.012 | 0.116 | 0.164 | 0.46  |
| T4 | 0.372 | 0.46  | 0.32  | 0.111 | 0.105 | 0.105 |
| 15 | 0.012 | 0.158 | 0     | 0     | 0.268 | 0.11  |

According to various embodiments, for each group of documents obtained after the second filtration process, the topic distributions contained within each document in that set is taken. From this, a spread matrix for document-topic distribution may be created as illustrated in Table 1. Each element within the matrix represents a normalized alignment factor between the topics for two documents. The alignment factor may roughly translate to depth of overlap (as against term frequency in topic models) for the topics. Here, the topic distributions are aligned and not the word distributions within the documents. From the overlap distributions within the co-occurrence matrix, the semantic alignment probability of two documents using LSI may be calculated. The topic distribution based co-occurrence versus term-frequency vastly reduces alignment computation without impact on accuracy. Once the co-occurrence matrix is created, for computational purposes, a dimensionality reduction using SVD of the matrix may be performed. Further, K-dimension may be selected that give most prominent approximation to the original matrix, ignoring the rest as noise.

According to various embodiments, the SVD may allow decomposing co-occurrence matrix into ortho-normal vectors and a scalar factor. To compute K, square of singular values and a cut-off of all dimensions are taken that give values below a set threshold. The below matrix shows the SVD matrices for 3 documents. For example, depending on the content spread within the corpus, varied K anywhere from 3 to 18 may be obtained.

$$U \quad \Sigma \quad V$$

$$\begin{bmatrix} 0.347 & -0.307 & 0.588 \\ 0.222 & 0.807 & 0.279 \\ 0.838 & -0.215 & -0.043 \\ 0.138 & -0.200 & -0.621 \end{bmatrix} \begin{bmatrix} 0.801 & 0 & 0 \\ 0 & 0.23 & 0 \\ 0 & 0 & 0.167 \end{bmatrix}$$

$$\begin{bmatrix} 0.613 & 0.653 & 0.445 \\ 0.765 & -0.349 & -0.542 \\ 0.198 & -0.672 & 0.713 \end{bmatrix}$$

FIG. 4 shows a limited overview of the controller unit 306 but, it is to be understood that other embodiments are not limited thereto. Further, the controller unit 306 may include any number of units communicating among each other for tracking the content.

Figure 5:
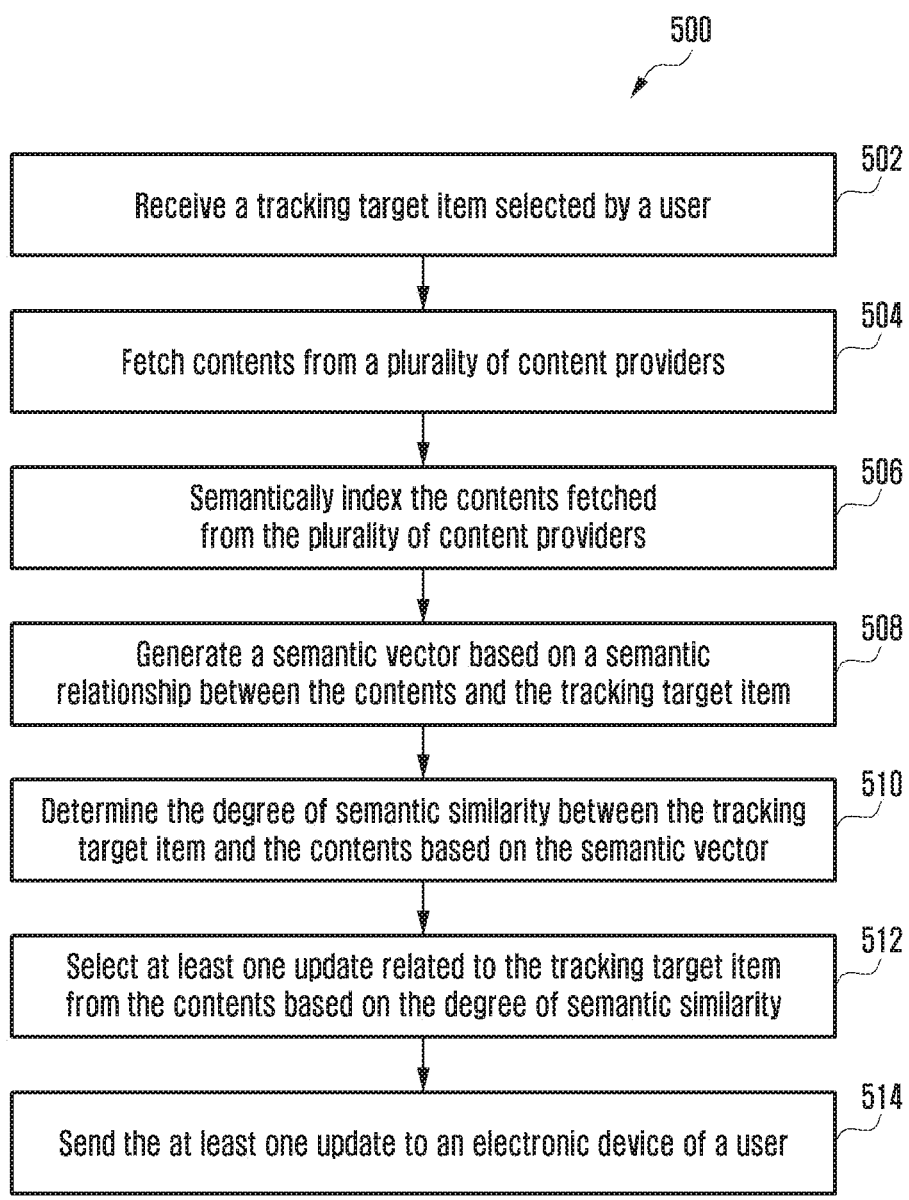
FIG. 5 is flow diagram illustrating a content tracking method according to various embodiments of the present disclosure.

FIG. 5 is flow diagram 500 illustrating a content tracking method according to various embodiments of the present disclosure.

Referring to FIG. 5, according to various embodiments, at operation 502, the server 104 may receive the tracking target item selected by the user. The server 104 may receive, through the input unit 302, the tracking target item selected by the user. In an embodiment, the tracking target item may include the data cluster, the story, the web-page DOM tree, the URI, the area of selection, or combination of same. In an example, the user may select the content region on the web page. The user may perform the long press gesture on the content region selected by the user in order to track the content. In another example, the user may select the data cluster generated from the user's browsing history. The user may perform the long press gesture on the selected data cluster to track the content.

According to various embodiments, at operation 504, the server 104 may fetch the contents from the content providers 106. The server 104 may fetch, through the semantic matching unit 304, the contents from the content providers 106.

According to various embodiments, at operation 506, the server 104 may semantically index the contents fetched from the content providers 106. For example, the server 104 may semantically index, through the semantic matching unit 304, the contents fetched from the content providers 106.

According to various embodiments, at operation 508, the server 104 may generate the semantic vector based on the semantic relationship between the contents and the tracking target item. For example, the server 104 may generate, through the semantic matching unit 304, the semantic vector based on the semantic relationship between the contents and the tracking target item.

According to various embodiments, at operation 510, the server 104 may determine the degree of semantic similarity between the tracking target item and the contents based on the semantic vector. For example, the server 104 may determine, through the semantic matching unit 304, the degree of semantic similarity between the tracking target item and the contents based on the semantic vector.

According to various embodiments, at operation 512, the server 104 may select the update related to the tracking target item from the contents based on the degree of semantic similarity. For example, the server 104 may select, through the controller unit 306, the update related to the tracking target item from the contents based on the degree of semantic similarity. The update related to the tracking target item may be selected by filtering the contents based on the degree of semantic similarity. The update may correspond to an update to the tracking target item or current state of the tracking target item.

According to various embodiments, at operation 514, the server 104 may send the update to the electronic device 102 of the user. For example, the server 104 may send, through the output unit 308, the update to the electronic device 102 of the user.

According to various embodiments, the data cluster selected by the user may be dropped on to the "Tracking Canvas". The current state of the content as previously browsed by user, say from "Politics" data cluster (i.e., tracking target item) will be displayed in the "Tracking Canvas". The data cluster may be formed from the user's browsing history. Each data cluster will represent a topic such as "Politics", "Sports", or the like and will be made up of articles from that category. By dropping the data cluster on the "Tracking Canvas" will show what the current state of the content and no continuous tracking may be performed.

According to various embodiments, the various actions, acts, blocks, operations, or the like may be performed in the order presented, in a different order or simultaneously. Further, in some embodiments, some of the actions, acts, blocks, operations, or the like may be omitted, added, modified, skipped, or the like without departing from the scope of the disclosure.

Figure 6:
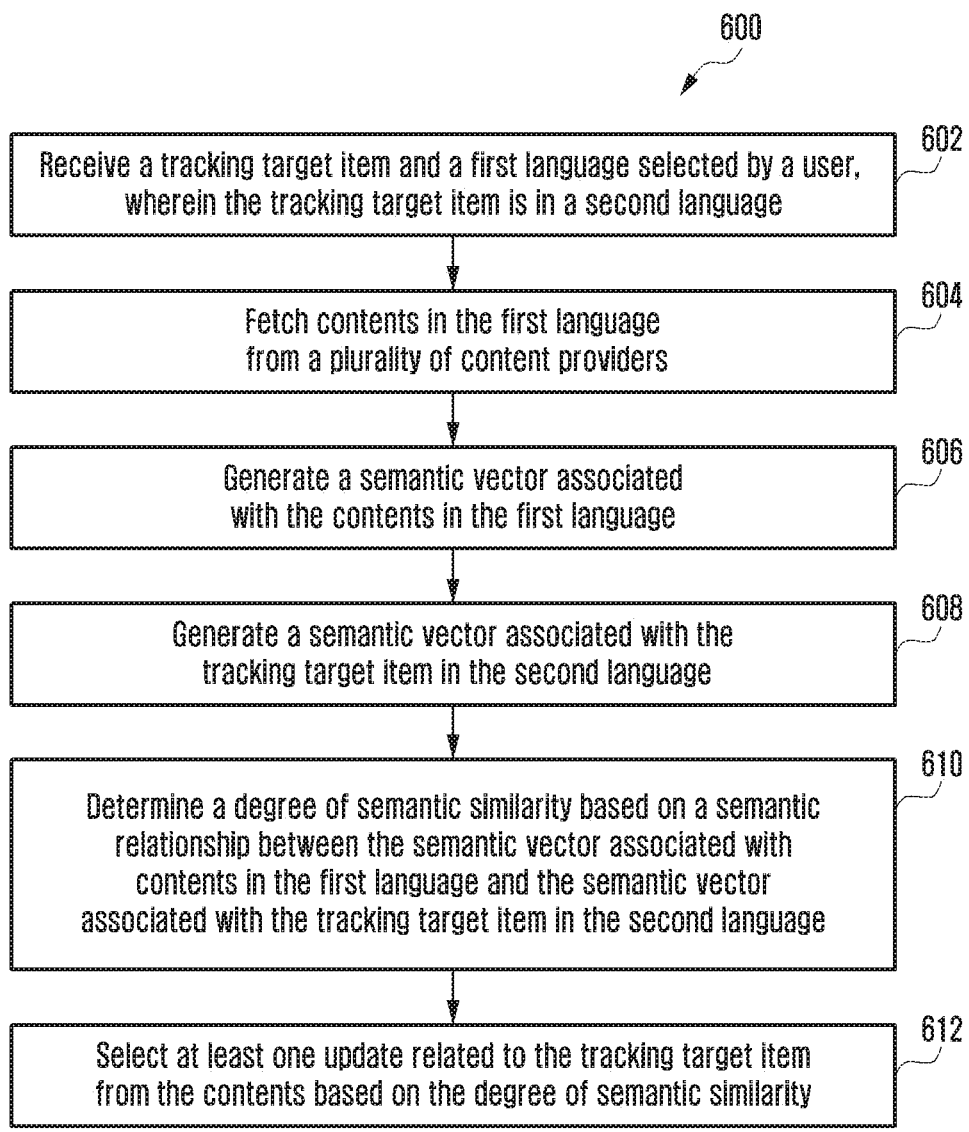
FIG. 6 is a flow diagram illustrating a method for tracking content configured in a language being different from that of a tracking target item according to various embodiments of the present disclosure.

FIG. 6 is a flow diagram 600 illustrating a method for tracking content configured in a language being different from that of a tracking target item according to various embodiments of the present disclosure.

Referring to FIG. 6, according to various embodiments, at operation 602, the server 104 may receive the tracking target item and the first language selected by the user. For example, the server 104 may receive, through the input unit 302, the tracking target item and the first language selected by the user, wherein the tracking target item may be configured in the second language. In an embodiment, the tracking target item may include the data cluster, the story, the web-page DOM tree, the URI, the area of selection, or combination of same.

According to various embodiments, at operation 604, the server 104 may fetch the contents in the first language from the content providers 106. For example, the server 104 may fetch, through the semantic matching unit 304, the contents in the first language from the content providers 106.

According to various embodiments, at operation 606, the server 104 may generate the semantic vector associated with the contents in the first language. For example, the server 104 may generate, through the semantic matching unit 304, the semantic vector associated with the contents in the first language.

According to various embodiments, at operation 608, the server 104 may generate the semantic vector associated with the tracking target item in the second language. For example, the server 104 may generate, through the semantic matching unit 304, the semantic vector associated with the tracking target item in the second language.

According to various embodiments, at operation 610, the server 104 may determine the degree of semantic similarity based on the semantic relationship between the semantic vectors associated with contents in the first language and the semantic vector associated with the tracking target item in the second language. For example, the server 104 may determine, through the semantic matching unit 304, the degree of semantic similarity based on the semantic relationship between the semantic vector associated with contents in the first language and the semantic vector associated with the tracking target item in the second language.

According to various embodiments, at operation 612, the server 104 may send the contents in the first language to the electronic device 102 of the user based on the degree of semantic similarity. For example, the server 104 may send, through the output unit 308, the contents in the first language to the electronic device 102 of the user based on the degree of semantic similarity.

According to various embodiments, the various actions, acts, blocks, operations, or the like may be performed in the order presented, in a different order or simultaneously. Further, in some embodiments, some of the actions, acts, blocks, operations, or the like may be omitted, added, modified, skipped, or the like without departing from the scope of the disclosure.

Figure 7:
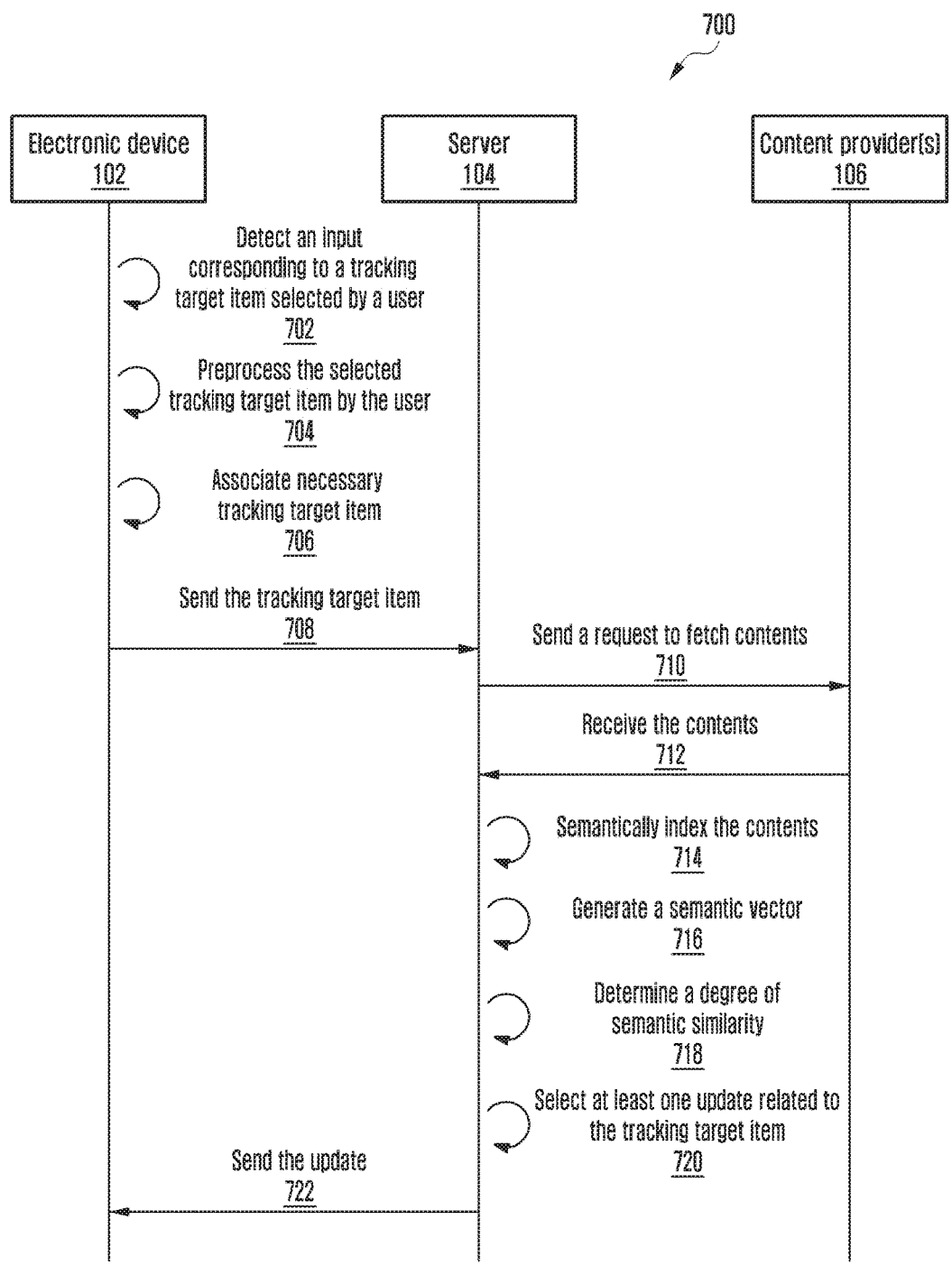
FIG. 7 is a flow diagram illustrating a method for tracking content through the content tracking system according to various embodiments of the present disclosure.

FIG. 7 is a flow diagram 700 illustrating a method for tracking content through the content tracking system according to various embodiments of the present disclosure.

Referring to FIG. 7, according to various embodiments, the flow diagram 700 may briefly depict communication between the electronic device 102, the server 104, and the content providers 106.

According to various embodiments, at operation 702, the electronic device 102 may detect an input related to the tracking target item selected by the user. For example, the tracking target item may include the data cluster, the story, the web-page DOM tree, the URI, the area of selection, or combination of same.

According to various embodiments, at operation 704, the electronic device 102 may preprocess the tracking target item selected by the user.

According to various embodiments, at operation 706, the electronic device 102 may associate the necessary tracking target item.

According to various embodiments, at operation 708, the electronic device 102 may send the tracking target item selected by the user to the server 104.

According to various embodiments, at operation 710, the server 104 may send a request to fetch the contents from the content providers 106.

According to various embodiments, at operation 712, the content providers 106 may send the response including the contents requested by the server 104 to the server 104.

According to various embodiments, at operation 714, the server 104 may semantically index the contents fetched from the content providers 106.

According to various embodiments, at operation 716, the server 104 may generate the semantic vector based on the semantic relationship between the contents and the tracking target item.

According to various embodiments, at operation 718, the server 104 may determine the degree of semantic similarity between the tracking target item and the contents based on the semantic vector.

According to various embodiments, at operation 720, the server 104 may select at least one update related to the tracking target item from the contents based on the degree of semantic similarity. For example, the update related to the tracking target item may be selected by filtering the contents based on the degree of semantic similarity. The update may correspond to at least one of the update to the tracking target item and current state of the tracking target item.

According to various embodiments, at operation 722, the server 104 may send the update to the electronic device 102 of the user.

FIG. 8 is a flow diagram 800 illustrating a method for tracking content configured in a language being different from that of a tracking target item according to various embodiments of the present disclosure.

Referring to FIG. 8, according to various embodiments, the flow diagram may depict communication between the electronic device 102, the server 104, and the content providers 106.

According to various embodiments, at operation 802, the electronic device 102 may detect the input related to the tracking target item and the first language selected by the user. The tracking target item is in the second language.

According to various embodiments, at operation 804, the electronic device 102 may preprocess the tracking target item selected by the user.

According to various embodiments, at operation 806, the electronic device 102 may associate the necessary tracking target item.

According to various embodiments, at operation 808, the electronic device 102 may send the tracking target item and the first language selected by the user to the server 104.

According to various embodiments, at operation 810, the server 104 may send the request to fetch the contents in the first language from the content providers 106.

According to various embodiments, at operation 812, the content providers 106 may send the response including the contents in the first language requested by the server 104.

According to various embodiments, at operation 814, the server 104 may generate the semantic vector associated with the contents in the first language.

According to various embodiments, at operation 816, the server 104 may generate the semantic vector associated with the tracking target item in the second language.

According to various embodiments, at operation 818, the server 104 may determine the degree of semantic similarity based on the semantic relationship between the semantic vector associated with the contents in the first language and the semantic vector associated with the tracking target item in the second language.

According to various embodiments, at operation 822, the server 104 may send the contents in the first language to the electronic device 102 of the user.

Figure 9B:
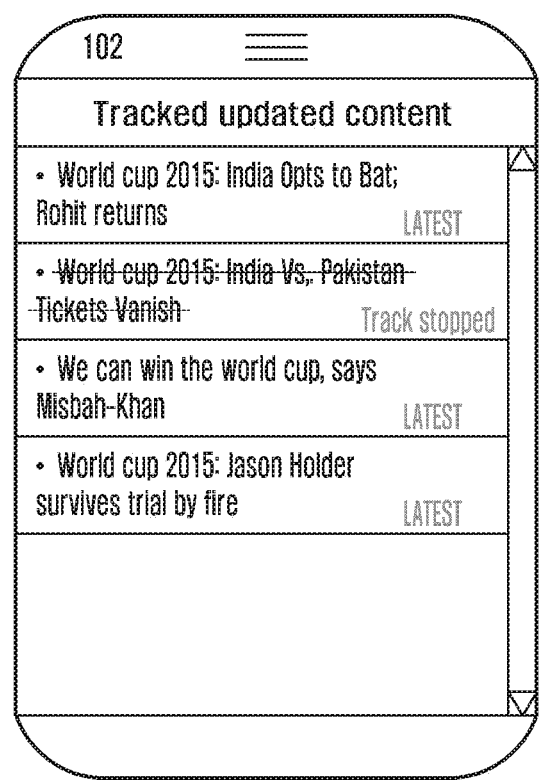

FIGS. 9A and 9B are drawings illustrating a user interface for selecting a tracking target item and displaying content tracked on the basis of the tracking target item according to various embodiments of the present disclosure.

Referring to FIG. 9A, according to various embodiments, the user may select the news article "World cup to kick start in 2 weeks; hosted by Australia" (i.e., tracking target item) from the web page displayed on the electronic device 102 to track the updates from the same or different sources (i.e., content providers 106).

According to various embodiments, the electronic device 102 may send the selected news article to the server 104. After receiving the news article, the server 104 may track the content (i.e., same or similar news articles) related to the selected news article "World cup to kick start in 2 weeks; hosted by Australia" on the same or different sources. The server 104 may track the content to determine whether any updates are available related to the selected news article. After determining the updated news articles, the server 104 may send the tracked content (i.e., news articles) to the electronic device 102 of the user. Namely, the electronic device 102 may receive the tracked content from the server 104.

Referring to FIG. 9B, according to various embodiments, the user may perform the long press gesture to delete the news article. Here, the user may perform the long press gesture on the news article "World cup 2015: India Vs Pakistan Tickets Vanish" to delete the same. For example, once the news article is deleted, it may display a strike through font.

According to various embodiments, content semantics may be used to track the content. The region or the content in the web page may be selected to track the story. Further, a notification may be displayed whenever the story to be tracked progresses as reported by same or different sources.

Figure 10:
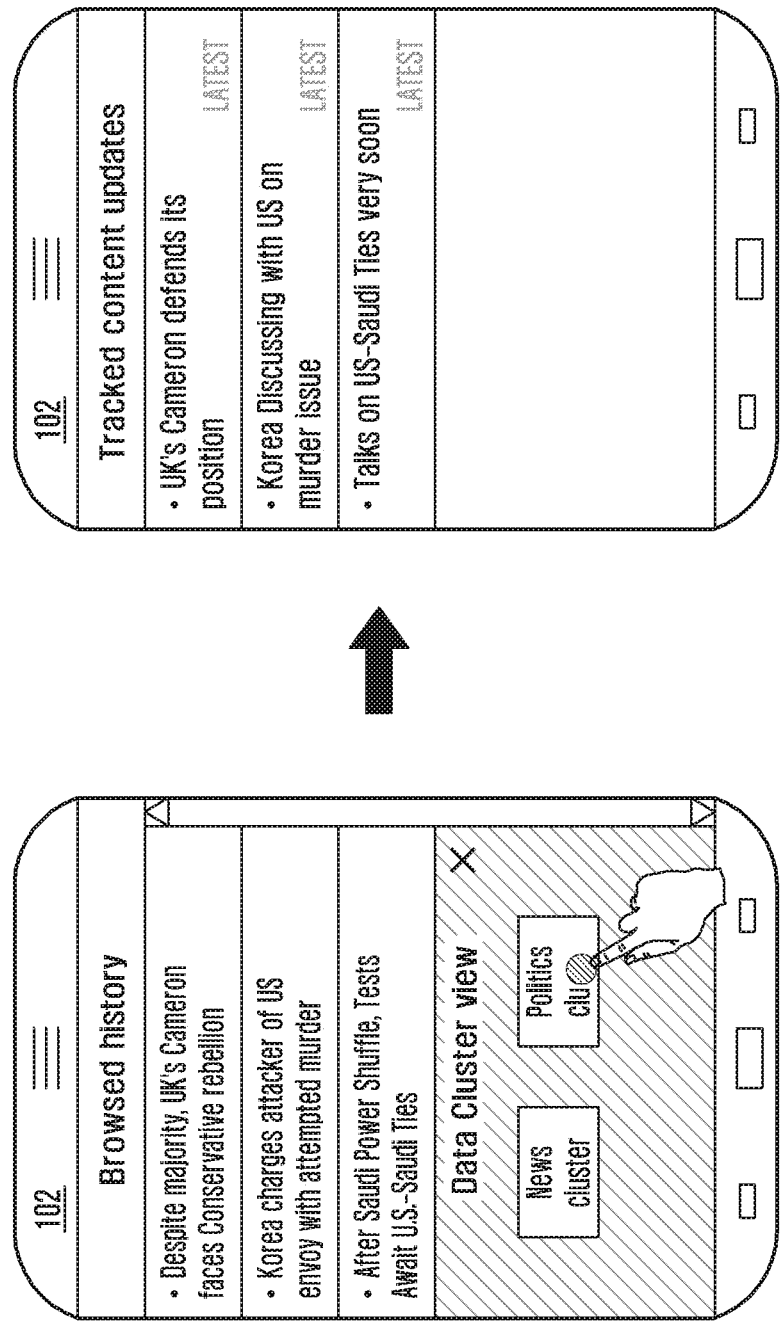
FIG. 10 is a diagram illustrating a user interface for using a data cluster and displaying content corresponding to the data cluster according to various embodiments of the present disclosure.

FIG. 10 is a diagram illustrating a user interface for using a data cluster and displaying content corresponding to the data cluster according to various embodiments of the present disclosure.

Referring to FIG. 10, according to various embodiments, the user may select the data cluster "Politics" (i.e., tracking target item) from the data cluster view displayed on the electronic device 102. The data cluster may be selected by the user to track the updates from the same or different sources related to the selected data cluster.

According to various embodiments, the electronic device 102 may send the data cluster to the server 104. After receiving the data cluster, the server 104 extracts the previously browsed content in the "Politics" data cluster. The server 104 may determine the current state of the browsed content by fetching the contents from the same or different sources. After determining the current state of the browsed content, the server 104 may send the current state (i.e., latest tracked updates) of the browsed content to the electronic device 102. The latest tracked updates may then be displayed to the user as illustrated in FIG. 10.

Figure 11:
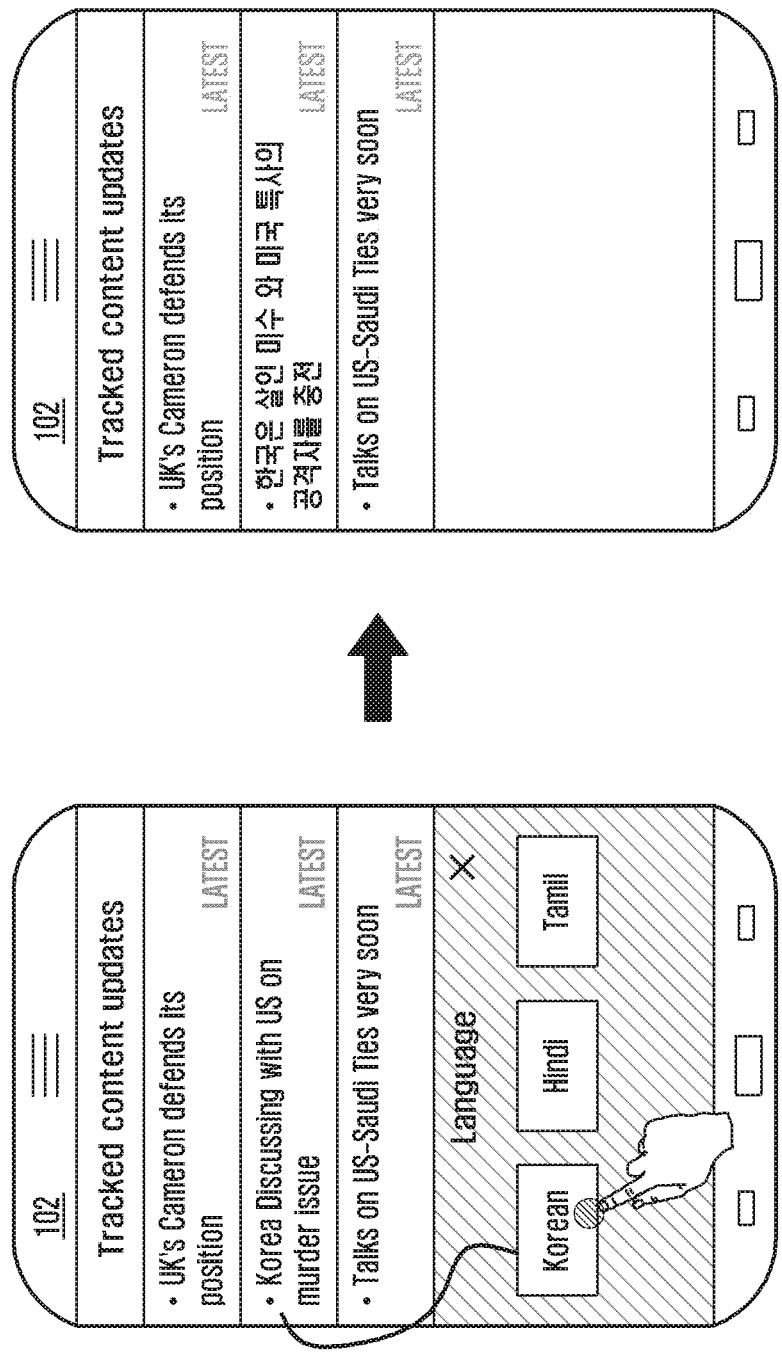
FIG. 11 is a diagram illustrating a user interface for switching a language of a tracked content and displaying the same content with a different language according to various embodiments of the present disclosure.

FIG. 11 is a diagram illustrating a user interface for switching a language of a tracked content and displaying the same content with a different language according to various embodiments of the present disclosure.

Referring to FIG. 11, according to various embodiments, the user may select the "Korean" language (i.e., first language) and the news article "Korea Discussing with US on murder issue", where the news article is in the "English" language (i.e., second language). In an embodiment, the user may drag and drop the selected "Korean" language on to the news article. The electronic device 102 may send the selected news article and the "Korean" language to the server 104. After receiving the news article and the "Korean" language, the server 104 may fetch the contents in the "Korean" language from the same or different sources and generate the semantic vector associated with the contents in the "Korean" language.

According to various embodiments, the server 104 may generate the semantic vector associated with the news article in the "English" language. The server 104 may determine the degree of semantic similarity based on the semantic relationship between the semantic vector associated with the contents in the "Korean" language and the semantic vector associated with the news article in the "English" language. Further, the server 104 may select the same story or the current active story related to the selected news article in the "Korean" language and send to the electronic device 102. As illustrated in FIG. 11, the selected news article in the "Korean" language may be displayed to the user of the electronic device 102.

Figure 12:
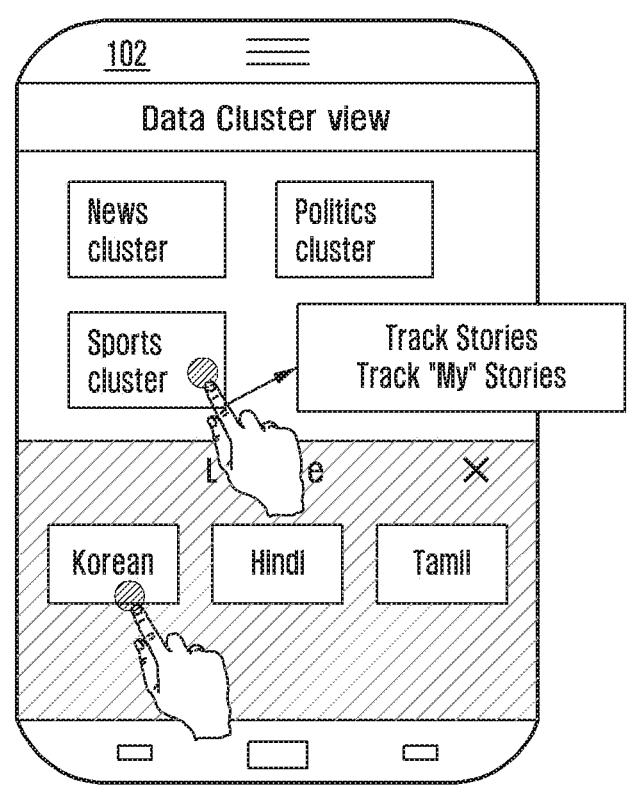
FIG. 12 is a diagram illustrating a user interface for selecting illustrates an example for selecting a data cluster and a language and tracking content according to various embodiments of the present disclosure.

FIG. 12 is a diagram illustrating a user interface for selecting illustrates an example for selecting a data cluster and a language and tracking content according to various embodiments of the present disclosure.

Referring to FIG. 12, according to various embodiments, the user may perform the long press gesture on the "Sports" data cluster. The user may be provided with the following options such as "Track Top Stories" and "Track Stories".

According to various embodiments, by using the "Track Top Stories", the user may track the top stories (i.e., contents) that are being tracked globally on the selected data cluster by sending the URL, cluster vector, or combination of same to the server 104. By using the "Track My Stories", the user may track the "active" stories on the selected data cluster based on user's browsing history. In an embodiment, the electronic device 102 may send the request to track stories based on the user's browsing history to the server 104.

According to various embodiments, the electronic device 102 may send "Local, History URLs, Cluster vector" to the server 104. Further, the user may drag and drop the language to get the content on the user selected language as illustrated in FIG. 12.

According to various embodiments, the user may perform the long press on the data cluster to track stories (i.e., content) represented by that particular cluster. The notifications may be sent whenever the story progresses. This time, the story will be based on the web sites user browsed in past that belongs to that data cluster. This is different to dropping the data cluster on the "Tracking Canvas". Dropping may only display "Current status" of the story while long press and select "track" on the data cluster will start tracking and notifications will arrive. The stories tracked may be based on stories that user browsed in past that belongs to the data cluster (example, "Indian Politics").

Figure 13:
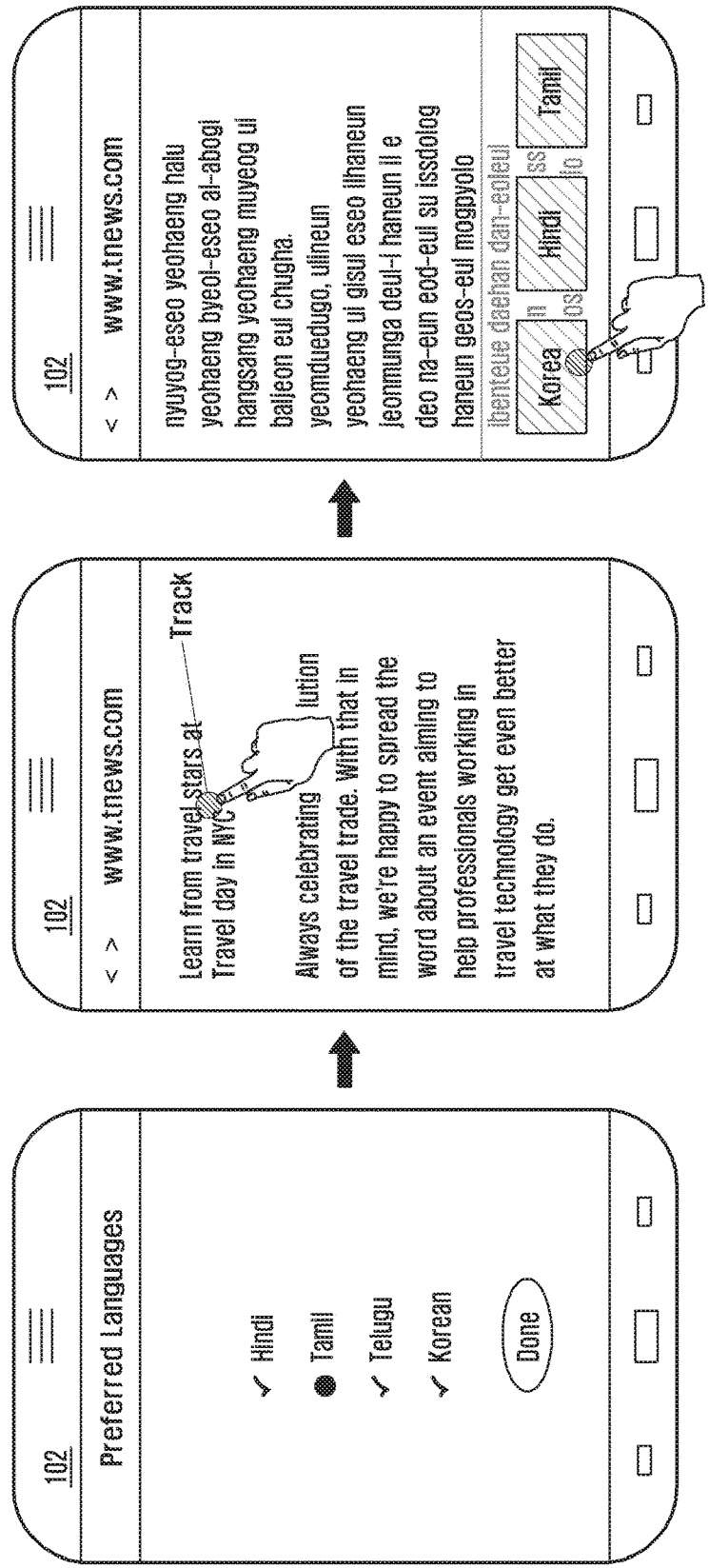
FIG. 13 is a diagram illustrating a user interface for selecting a language and tracking content in the selected language according to various embodiments of the present disclosure.

FIG. 13 is a diagram illustrating a user interface for selecting a language and tracking content in the selected language according to various embodiments of the present disclosure.

Referring to FIG. 13, according to various embodiments, the user may select "Hindi", "Telugu", and "Korean" as preferred languages. The user may perform the long press gesture on the article to track the story. The server 104 returns all the language names such as "Urdu", "Hindi", "Korean", and "Japanese" in which the article is available at the server 104. The user may select the "Korean" language (i.e., first language) to change the story to the "Korean" language.

According to various embodiments, the user may drop a language icon on the tracked content over the "Tracking Canvas". The user may switch to a different language, example "Korean". The user may drop language on the tracked story (i.e., content) or press language icon to apply to the entire "Tracking Canvas". The server 104 may support the dynamic switching between languages that are supported on the server 104. The user may select languages and may even decide to receive notification of one story in one language and another in different language. When switching languages, the story remains the same but the content may be sourced from different domains. The semantics may be matched when switching between languages are performed.

Figure 14:
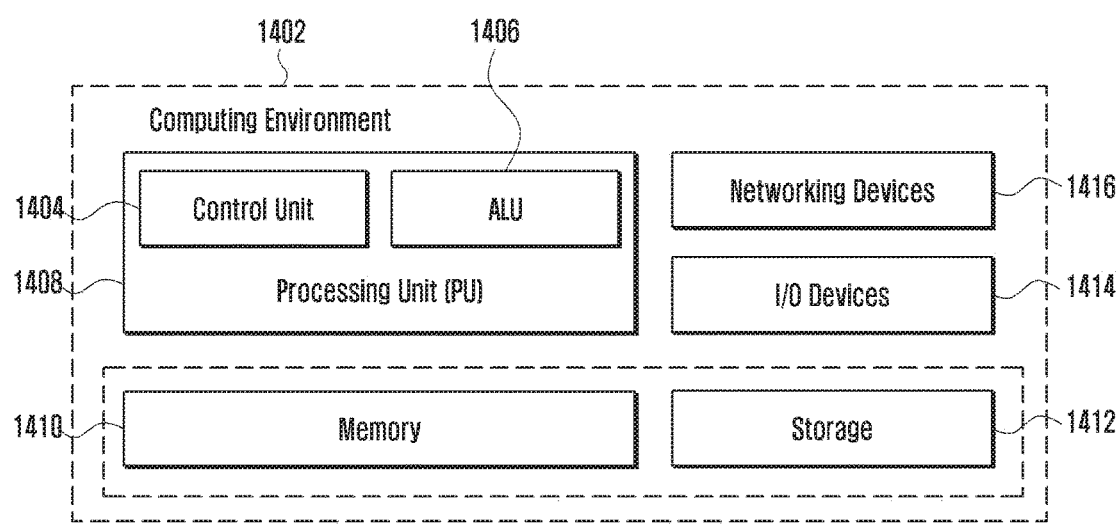
FIG. 14 is a block diagram illustrating a computing environment implementing the method and system for tracking content according to various embodiments of the present disclosure.

FIG. 14 is a block diagram illustrating a computing environment implementing the method and system for tracking content according to various embodiments of the present disclosure.

Referring to FIG. 14, according to various embodiments, the computing environment 1402 may include at least one processing unit 1408 that is equipped with a control unit 1404 and an arithmetic logic unit (ALU) 1406, a memory 1410, a storage unit 1412, plurality of networking devices 1416 and a plurality of input output (I/O) devices 1414. The processing unit 1408 may be responsible for processing the instructions of the scheme. The processing unit 1408 may receive commands from the control unit in order to perform its processing. Further, any logical and arithmetic operations involved in the execution of the instructions may be computed with the help of the ALU 1406.

The overall computing environment 1402 may be composed of multiple homogeneous or heterogeneous cores, multiple CPUs of different kinds, special media and other accelerators. The processing unit 1408 may be responsible for processing the instructions of the scheme. Further, the plurality of processing units 1408 may be located on a single chip or over multiple chips.

The scheme comprising of instructions and codes required for the implementation may be stored in either the memory unit 1410 or the storage 1412 or both. At the time of execution, the instructions may be fetched from the corresponding memory 1410 or storage 1412, and executed by the processing unit 1408.

In case of any hardware implementations various networking devices 1416 or external I/O devices 1414 may be connected to the computing environment to support the implementation through the networking unit and the I/O device unit.

The embodiments disclosed herein may be implemented through at least one software program running on at least one hardware device and performing network management functions to control the elements. The elements illustrated in FIGS. 1 to 14 include blocks which may be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a communication circuit; and
   a processor electrically connected to the communication circuit,
   wherein the processor is configured to:
   receive information about a tracking target item from an external electronic device,
   receive content from a content provider,
   generate a semantic vector related to the content,
   generate a semantic vector related to the tracking target item,
   determine a degree of semantic similarity between the tracking target item and the content, by computing a co-occurrence matrix obtained based on a semantic relationship between the semantic vector related to the content and the semantic vector related to the tracking target item,
   generate at least one update related to the tracking target item, based on the degree of semantic similarity between the tracking target item and the content, and
   send the at least one update to the external electronic device,
   wherein the co-occurrence matrix is obtained based on a topic distribution having alignment factors, each of the alignment factors representing a depth of overlap between the semantic vector related to the content and the semantic vector related to the tracking target item.

2. The electronic device of claim 1, wherein the processor is further configured to:
   generate the at least one update by filtering the content, based on the degree of semantic similarity.

3. The electronic device of claim 1, wherein the tracking target item comprises at least one of a data cluster, a story, a webpage document object model (DOM) tree, a uniform resource identifier (URI), and data contained in an area selected in a webpage by a user of the external electronic device.

4. The electronic device of claim 1, wherein the at least one update corresponds to at least one of a current state of the tracking target item and an update to the tracking target item.

5. The electronic device of claim 1, wherein the processor is further configured to:
   receive information about a first language for the at least one update from the external electronic device,
   receive information about a second language of the tracking target item from the external electronic device,
   determine the degree of semantic similarity between the content in the first language and the tracking target item in the second language, and
   send the content in the first language to the external electronic device, based on the degree of semantic similarity.

6. The electronic device of claim 1, wherein the processor is further configured to determine the degree of semantic similarity between the tracking target item and the content, by computing singular value decomposition (SVD) of the co-occurrence matrix.

7. A method for tracking content in an electronic device, the method comprising:
receiving information about a tracking target item from an external electronic device;
receiving content from a content provider;
generating a semantic vector related to the content;
generating a semantic vector related to the tracking target item;
determining a degree of semantic similarity between the tracking target item and the content, by computing a co-occurrence matrix obtained based on a semantic relationship between the semantic vector related to the content and the semantic vector related to the tracking target item;
generating at least one update related to the tracking target item, based on the degree of semantic similarity between the tracking target item and the content; and
sending the at least one update to the external electronic device,
wherein the co-occurrence matrix is obtained based on a topic distribution having alignment factors, each of the alignment factors representing a depth of overlap between the semantic vector related to the content and the semantic vector related to the tracking target item.

8. The method of claim 7, wherein the generating of the at least one update related to the tracking target item comprises:
generating the at least one update by filtering the content, based on the degree of semantic similarity.

9. The method of claim 7, wherein the tracking target item comprises at least one of a data cluster, a story, a webpage document object model (DOM) tree, a uniform resource identifier (URI), and data contained in an area selected in a webpage by a user of the external electronic device.

10. The method of claim 7, wherein the at least one update corresponds to at least one of a current state of the tracking target item and an update to the tracking target item.

11. The method of claim 7, further comprising:
receiving information about a first language for an update from the external electronic device;
receiving information about a second language of the tracking target item from the external electronic device;
determining the degree of semantic similarity between the content in the first language and the tracking target item in the second language; and
sending the content in the first language to the external electronic device, based on the degree of semantic similarity.

12. An electronic device comprising:
a display;
a communication circuit; and
a processor electrically connected to the display and the communication circuit,
wherein the processor is configured to:
receive an input of selecting a tracking target item from a user,
send information about the tracking target item to an external electronic device, and
receive at least one update which is related to the tracking target item and determined based on a degree of semantic similarity from the external electronic device,
wherein the degree of semantic similarity is obtained by computing singular value decomposition (SVD) of a co-occurrence matrix obtained based on a topic distribution having alignment factors, each of the alignment factors representing a depth of overlap between a topic of the content and a topic of the tracking target item.

13. The electronic device of claim 12, wherein the tracking target item comprises at least one of a data cluster, a story, a webpage document object model (DOM) tree, a uniform resource identifier (URI), and data contained in an area selected in a webpage by a user of the external electronic device.

14. The electronic device of claim 12, wherein the processor is further configured to:
receive an input of selecting a first language for the update from the user,
send information about the first language and information about a second language of the tracking target item to the external electronic device, and
receive the content in the first language related to the tracking target item, based on the degree of semantic similarity.

15. A method for receiving tracked content in an electronic device, the method comprising:
receiving an input of selecting a tracking target item from a user;
sending information about the tracking target item to an external electronic device; and
receiving at least one update related to the tracking target item and based on a degree of semantic similarity from the external electronic device,
wherein the degree of semantic similarity is obtained by computing singular value decomposition (SVD) of a co-occurrence matrix obtained based on a topic distribution having alignment factors, each of the alignment factors representing a depth of overlap between a topic of the content and a topic of the tracking target item.

16. The method of claim 15, wherein the tracking target item comprises at least one of a data cluster, a story, a webpage document object model (DOM) tree, a uniform resource identifier (URI), and data contained in an area selected in a webpage by a user of the external electronic device.

17. The method of claim 15, further comprising:
receiving an input of selecting a first language for the update from the user;
sending information about the first language and information about a second language of the tracking target item to the external electronic device; and
receiving the content in the first language related to the tracking target item, based on the degree of semantic similarity.

* * * * *